(12) United States Patent
Agano et al.

(10) Patent No.: US 6,778,239 B2
(45) Date of Patent: Aug. 17, 2004

(54) LIGHT DIFFUSING PLATE AND DISPLAY APPARATUS

(75) Inventors: Toshitaka Agano, Kanagawa (JP); Akira Yamaguchi, Kanagawa (JP); Kenichi Nakagawa, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/484,223

(22) Filed: Jan. 18, 2000

(65) Prior Publication Data

US 2003/0169388 A1 Sep. 11, 2003

(30) Foreign Application Priority Data

Jan. 18, 1999 (JP) .......................................... 11-009282
Feb. 8, 1999 (JP) .......................................... 11-030010

(51) Int. Cl.$^7$ .......................................... G02F 1/1335
(52) U.S. Cl. ..................... 349/112; 359/614; 359/615; 359/540
(58) Field of Search .......................... 349/112; 359/536, 359/538, 539, 540, 541, 542, 599, 613, 614

(56) References Cited

U.S. PATENT DOCUMENTS

| | | | |
|---|---|---|---|
| 2,378,252 A | * | 6/1945 | Staehle ........................ 359/453 |
| 5,429,909 A | * | 7/1995 | Kaszczuk et al. ......... 346/135.1 |
| 5,629,785 A | * | 5/1997 | Valliath et al. ................ 349/86 |
| 5,633,118 A | | 5/1997 | Burberry et al. |
| 5,633,119 A | | 5/1997 | Burberry et al. |
| 5,781,344 A | * | 7/1998 | Vance ......................... 359/614 |
| 6,172,814 B1 | * | 1/2001 | Watanabe et al. ........... 359/619 |

FOREIGN PATENT DOCUMENTS

| | | | |
|---|---|---|---|
| GB | 2 083 726 A | | 3/1982 |
| GB | 002083726 A | * | 3/1982 |
| JP | 3-87827 A | | 4/1991 |
| JP | 4-211252 A | | 8/1992 |
| JP | 9-104173 A | | 4/1997 |
| JP | 9-104174 A | | 4/1997 |
| JP | 10-226174 A | | 8/1998 |

* cited by examiner

Primary Examiner—Tarifur R. Chowdhury
Assistant Examiner—Prasad R. Akkapeddi
(74) Attorney, Agent, or Firm—Sughrue Mion, PLLC

(57) ABSTRACT

The light diffusing plate includes an unrecognizable structure having an optical refractive power, passing areas through which a collimated light incident from a side of the unrecognizable structure passes and a non-passing area other than the passing areas, which has relatively low light transmissivity compared with the passing areas, wherein both materials of the passing areas and non-passing area are applied simultaneously. The display apparatus includes this light diffusing plate, a liquid crystal display panel and a backlight unit. The image display apparatus includes an image display device having a matrix structure and a light diffusing plate including an unrecognizable structure which has an optical refractive power and is provided on a viewing side of a display screen of the image display device. The light diffusing plate has an excellent light diffusing efficiency, and can preferably reduce a contrast drop to be caused by a surface reflection. The display apparatus for the liquid crystal display device can keep a satisfactory contrast ratio over a wide viewing angle and is preferably applicable to a medical use. The image display apparatus can eliminate pixelization or jaggy and obtain a smooth, natural displayed image.

34 Claims, 5 Drawing Sheets

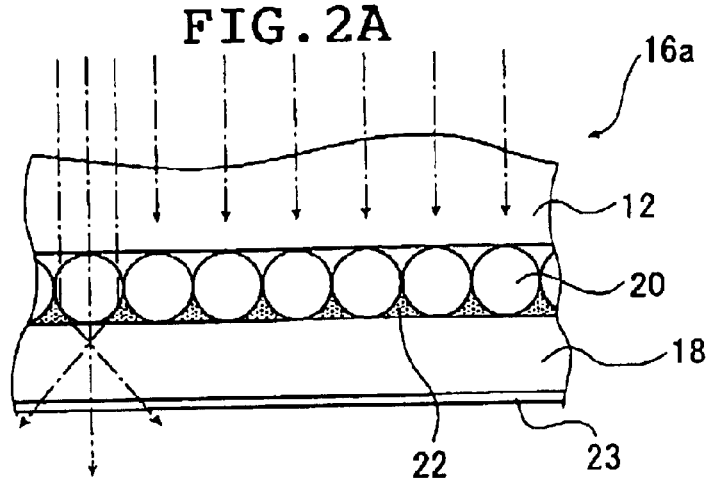
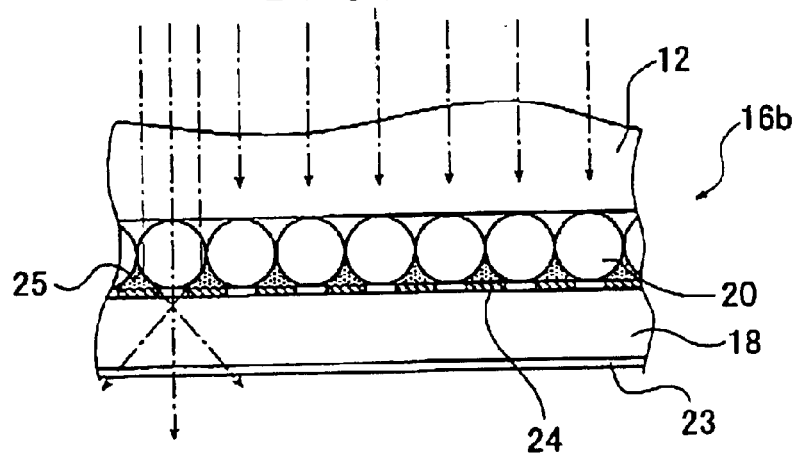
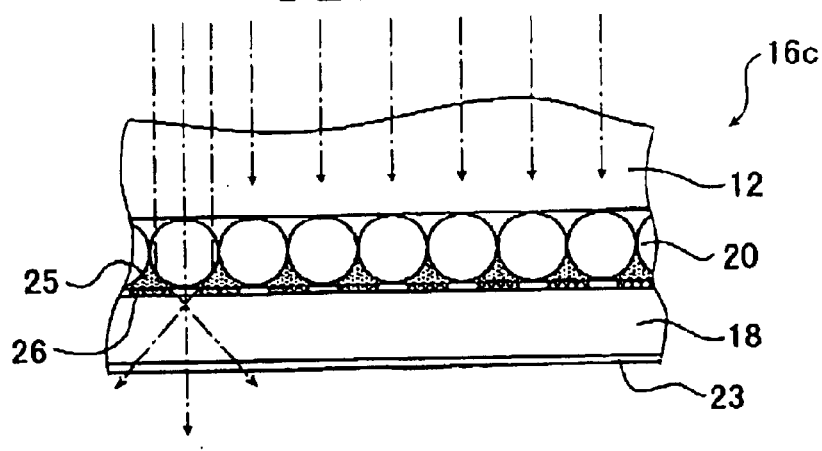

FIG. 3A 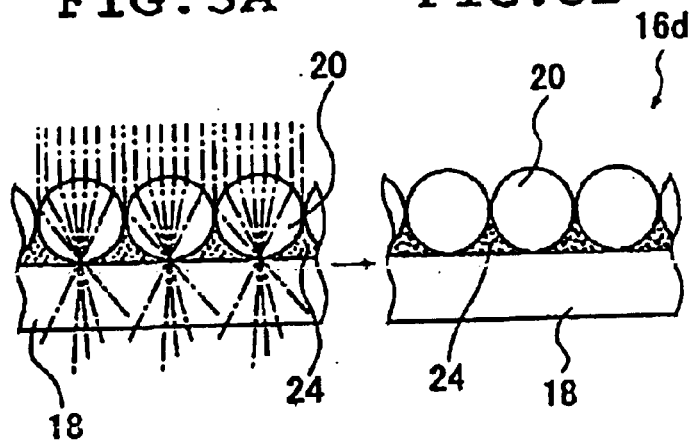 FIG. 3B FIG. 3C
FIG. 4A 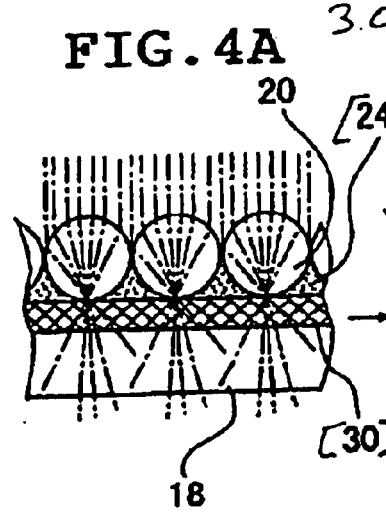 FIG. 4B 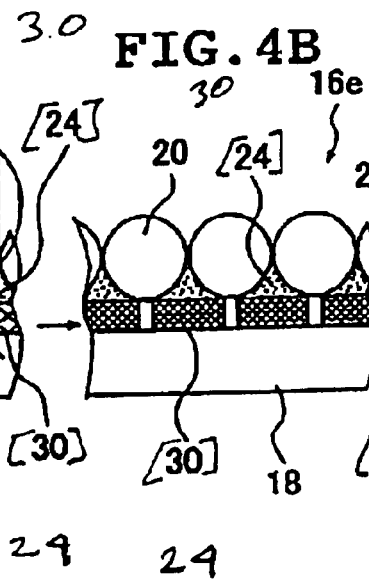 FIG. 4C 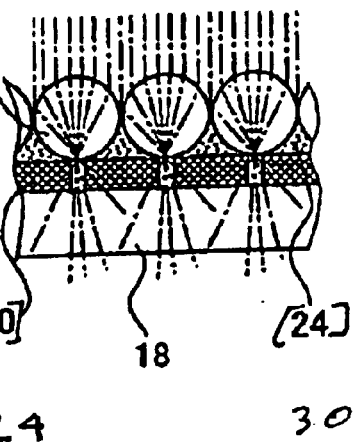
FIG. 5A 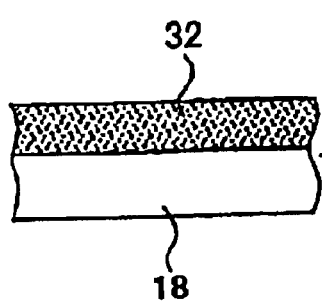 FIG. 5B 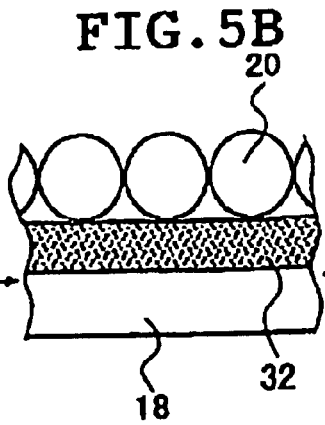 FIG. 5C 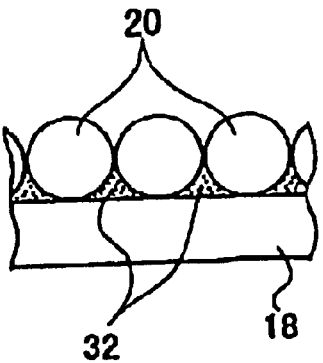

LIGHT DIFFUSING PLATE AND DISPLAY APPARATUS

BACKGROUND INFORMATION

This invention relates to the technical field of a light diffusing plate and a display apparatus, more particularly to a diffusion plate capable of realizing a liquid crystal display which has a wide viewing angle and represents a high contrast image, a liquid crystal display device utilizing the light diffusing plate and an image display apparatus having a matrix structure.

In recent years, with the increasing popularity of a word processor, a personal computer and the like, various image display apparatuses have been developed to be in use of representing an image.

An image display apparatus generally comprises a display device representing an image light converted from image information electrical signals, a driver circuit for driving this display device and a power supply for supplying electric power to this driver circuit. In accordance with an optical system of displaying or a driving system of display device, there exist various image display devices; however, a cathode ray tube (hereinafter referred to simply as "CRT") display is the most popular. For example, in the medical field such as ultrasonic diagnosis, CT (computer tomogaphy) diagnosis, MRI (magnetic resonance imaging) diagnosis and the like, a monochromatic CRT display has been used. The monochromatic CRT display has no digital matrix structure so that it can obtain a smooth and natural image.

The liquid crystal display (hereinafter referred to simply as "LCD") has advantages such as easy downsizability, thinness, light weight and the like so that it has recently been used in various fields. Particularly, as a display of a word processor or a computer, the LCD is rapidly expanding its usage. The LCD is under consideration for the application of a monitor for medical diagnosis device such as an ultrasonic diagnosis device, a CRT diagnosis device, an MRI diagnosis device or the like in which the CRT display has conventionally been primarily used.

While the LCD has many advantages such as easy downsizable, thinness, light weight and the like, as described above, it also has disadvantages that viewing angle characteristics are poor (narrow viewing angle), namely, the image can be seen differently since the contrast ratio of an image may sharply be decreased or an image gradation may be reversed depending on a viewing direction or angle. Therefore, there exists a problem that the image can not be appropriately viewed depending on a viewer's position or the like. Particularly, in the above-described medical application or the like, diagnosis is performed based on image density so that the image having a high contrast ratio is required and inappropriate recognition of the image would cause wrong diagnosis, inconsistency in the results of diagnoses or the like. Therefore, the image having the high contrast ratio displayed over a wide viewing angle is required in particular. Moreover, it is more problematic in the monitor of medical application that the represented image is generally monochromatic so that the image contrast which is dependent on the viewing angle decreases sharply.

As the LCD for a wide viewing angle, an LCD of In-Plane Switching (hereinafter referred to simply as "IPS") mode, Multi-domain Vertical Alignment (hereinafter referred to simply as "MVA") mode or the like has been known; however, even these have not secured a viewing angle wide enough for the monochromatic images, especially for the medical application.

On the other hand, as an LCD which can obtain a preferable contrast ratio over a wide viewing angle, a method has been known in which collimated light (parallel light) is used as backlight (collimated backlight) as well as light transmitted through a liquid crystal panel is diffused by a diffusion plate.

However, any LCD which attained a viewing angle wide enough for the medical application using the diffusion plate has yet to be realized. The method using the diffusion plate has a problem that external light or extraneous light incident on the diffusion plate is reflected as well as diffused; therefore, the contrast of a viewed image is decreased; as a result, an appropriate image can not be viewed in many cases.

As is seen in the LCD, a highly precise display in which not only a matrix structure of digital pixels is clear, but also sharpness is high, is appropriate for representing artificial images such as Computer Graphics (hereinafter referred to simply as "CG").

However, there is a problem that LCD has the matrix structure of digital pixels so that clearness of this matrix structure contradictorily provides a mosaic impression to a still image, such as an X-ray image, which has natural smoothness whereupon an improper appearance in which the image is jagged, namely, pixelization (or jaggy) occurs. When an image size is large (for example, about 300 $\mu$m in 15"XGA (Extended Graphics Array)), this problem becomes particularly conspicuous since vertical stripes of a matrix structure of a color filter are clearly seen.

Moreover, this problem is not limited to LCD, but the pixelization occurs in a color CRT, a Plasma Display Panel (hereinafter referred to simply as "PDP") or the like as long as they have a matrix structure.

SUMMARY OF THE INVENTION

A first object of the present invention is to solve the above-described problems of known prior arts and to provide a light diffusing plate which has an excellent light diffusing efficiency, and can preferably reduce a contrast drop to be caused by a surface reflection, keep a satisfactory contrast ratio over a wide viewing angle when applied to a liquid crystal display and realize the liquid crystal display preferably applicable to a medical use, and a display apparatus for the liquid crystal display device, which employs this light diffusing plate.

A second object of the present invention is to solve the above-described problems of known art and to provide an image display apparatus which can eliminate pixelization (jaggy), namely, perform depixelization and obtain a smooth, natural displayed image.

In order to attain the first objects described above, the first aspect of the present invention provides a light diffusing plate comprising: an unrecognizable structure which has an optical refractive power; passing areas through which a collimated light incident from a side of the unrecognizable structure passes; and a non-passing area other than the passing areas, which has relatively low light transmissivity compared with the passing areas; wherein materials of the passing areas and non-passing area are applied simultaneously.

It is preferable that the light diffusing plate comprises a light transmitting support and a diffusing layer formed on the light transmitting support by fixing light transmitting spheres which constitute the passing areas to the light transmitting support with a light absorptive binder which constitutes the non-passing area.

The present invention provides a light diffusing plate, comprising: a light transmitting support; a diffusing layer having light transmitting spheres; and a light-sensitive thermal developing material layer which is formed between the light transmitting support and the diffusing layer; wherein the light-sensitive thermal developing material layer contains a light-sensitive thermal developing material which forms no color in an exposed areas; and wherein the light-sensitive thermal developing material is heated to form a color after nearly collimated light is incident from the diffusing layer side.

The present invention provides a light diffusing plate comprising: a light transmitting support; a diffusing layer having light transmitting spheres; and a thermal ablative layer formed between the light transmitting support and the diffusing layer. Wherein the thermal ablative layer which contains a light absorptive thermal ablative material, in an area which is illuminated by a nearly collimated light incident from a side of the diffusing layer, is removed by thermal energy by means of the nearly collimated light.

The present invention provides a light diffusing plate comprising: a light transmitting support; a diffusing layer containing light transmitting spheres; and a contacting material which contacts the light transmitting spheres; wherein the contacting material contains a light-sensitive material which forms no color in an exposed area and a light absorptive material; and wherein the light-sensitive material is heated and developed to form a color after nearly collimated light is incident from a side of the diffusing layer.

The present invention provides a light diffusing plate comprising: a light transmitting support; a diffusing layer containing light transmitting spheres; a contacting material which contacts the light transmitting spheres and contains a light absorptive material; and a light-sensitive material which forms no color in an exposed area and is provided between the contacting material and the light transmitting support; wherein the light-sensitive material is heated and developed to form a color after nearly collimated light is incident from a side of the diffusing layer.

It is preferable that the diffusing layer is formed by forming a layer of the contacting material previously and then embedding the light transmitting spheres into the layer of the contacting material.

It is also preferable that a surface of a side opposite to the diffusing layer in the light transmitting support is treated with light non-reflection processing.

In order to attain the first object described above, the second aspect of the present invention provides a display apparatus comprising: a liquid crystal display panel; a backlight unit which forces a collimated light to be incident on the liquid crystal display panel; and a light diffusing plate which is located in an opposite side of the backlight unit against the liquid crystal display panel; wherein the light diffusing plate comprises an unrecognizable structure which has an optical refractive power, passing areas through which a collimated light incident from a side of the unrecognizable structure passes, and a non-passing area other than the passing areas, which has relatively low light transmissivity compared with the passing areas; and wherein materials of the passing areas and non-passing area axe applied simultaneously.

The present invention provides a display apparatus comprising: a liquid crystal display panel; a backlight unit which forces a collimated light to be incident on the liquid crystal display panel; and a light diffusing plate which is located in an opposite side of the backlight unit against the liquid crystal display panel; wherein the light diffusing plate comprises a light transmitting support, a diffusing layer having light transmitting spheres, and a light-sensitive thermal developing material layer which is formed between the light transmitting support and the diffusing layer; wherein the light-sensitive thermal developing material layer contains a light-sensitive thermal developing material which forms no color in an exposed area; and wherein the light-sensitive thermal developing material is heated to form a color after nearly collimated light is incident from the diffusing layer side.

The present invention provides a display apparatus comprising: a liquid crystal display panel; a backlight unit which forces a collimated light to be incident on the liquid crystal display panel; and a light diffusing plate which is located in an opposite side of the backlight unit against the liquid crystal display panel; wherein the light diffusing plate comprises a light transmitting support, a diffusing layer having light transmitting spheres, and a thermal ablative layer formed between the light transmitting support and the diffusing layer; wherein the thermal ablative layer which contains a light absorptive thermal ablative material; and wherein the thermal ablative material in an area which is illuminated by a nearly collimated light incident from a side of the diffusing layer is removed by thermal energy by means of the nearly collimated light.

The present invention provides a display apparatus comprising: a liquid crystal display panel; a backlight unit which forces a collimated light to be incident on the liquid crystal display panel; and a light diffusing plate which is located in an opposite side of the backlight unit against the liquid crystal display panel; wherein the light diffusing plate comprises a light transmitting support, a diffusing layer containing a light transmitting spheres, and a contacting material which contacts the light transmitting spheres; wherein the contacting material contains a light-sensitive material which forms no color in an exposed area and a light absorptive material; and wherein the light-sensitive material is heated and developed to form a color after nearly collimated light is incident from a side of the diffusing layer.

The present invention provides a display apparatus comprising: a liquid crystal display panel; a backlight unit which forces a collimated light to be incident on the liquid crystal display panel; and a light diffusing plate which is located in an opposite side of the backlight unit against the liquid crystal display panel; wherein the light diffusing plate comprises a light transmitting support, a diffusing layer containing light transmitting spheres, a contacting material which contacts the light transmitting spheres and contains a light absorptive material, and a light-sensitive material which forms no color in an exposed area and is provided between the contacting material and the light transmitting support; and wherein the light-sensitive material is heated and developed to form a color after nearly collimated light is incident from a side of the diffusing layer.

It is preferable that the display apparatus further comprises a preventing sheet for preventing from scattering an extraneous light wherein the preventing sheet is provided on the light diffusing plate which was provided on a viewing side of a display screen of the liquid crystal display panel.

In order to attain the third object described above, the third aspect of the present invention provides an image display apparatus comprising: an image display device having a matrix structure; and a light diffusing plate comprising: an unrecognizable structure which has an optical refractive power; passing areas through which a collimated light incident from a side of the unrecognizable structure passes; and a non-passing area other than the passing areas, which has relatively low light transmissivity compared with the passing areas, wherein materials of the passing areas and non-passing area are applied simultaneously, and wherein the light diffusing plate is provided on a viewing side of a display screen of the image display device.

It is preferable that the light diffusing plate comprises a light transmitting support and a diffusing layer formed by fixing light transmitting spheres with a binder on the light transmitting support.

It is also preferable that the image display apparatus further comprises a preventing sheet for preventing from scattering an extraneous light; wherein the preventing sheet is provided on the light diffusing plate which was provided on the viewing side of the display screen.

The present invention provides an image display apparatus comprising: an image display device having a matrix structure; and a light diffusing plate comprising an unrecognizable structure which has an optical refractive power; wherein the light diffusing plate is provided on a viewing side of a display screen of the image display device.

It is preferable that the light diffusing plate comprises a light transmitting support and a diffusing layer formed by fixing light transmitting spheres with a binder on the light transmitting support.

It is also preferable that the image display apparatus further comprises a preventing sheet for preventing from scattering an extraneous light; wherein the preventing sheet is provided on the light diffusing plate which was provided on the viewing side of the display screen.

BRIEF DESCRIPTION OF THE DRAWINGS

FIGS. 2A, 2B and 2C are sectional schematic views each conceptually showing an embodiment of the light diffusing plate of the present invention;

FIG. 3A is a sectional schematic view conceptually showing an example of a production step of an embodiment of the light diffusing plate of the present invention;

FIG. 3B is a sectional schematic view of the light diffusing plate produced in FIG. 3A; and FIG. 3C is a sectional schematic view conceptually showing an example of a usage form of the light diffusing plate shown in FIG. 3B;

FIG. 4A is a sectional schematic view conceptually showing an example of a production step of another embodiment of the light diffusing plate of the present invention;

FIG. 4B is a sectional schematic view of the light diffusing plate produced by FIG. 4A; and FIG. 4C is a sectional schematic view conceptually showing an example of a usage form of the light diffusing plate shown in FIG. 4B;

FIGS. 5A, 5B and 5C are sectional schematic views each conceptually showing a step for producing another embodiment of the light diffusing plate of the present invention;

DETAILED DESCRIPTION OF THE INVENTION

On the pages that follow, a light diffusing plate and a display apparatus of the present invention will now be described in detail with reference to the preferred embodiments shown in the accompanying drawings.

Figure 1:
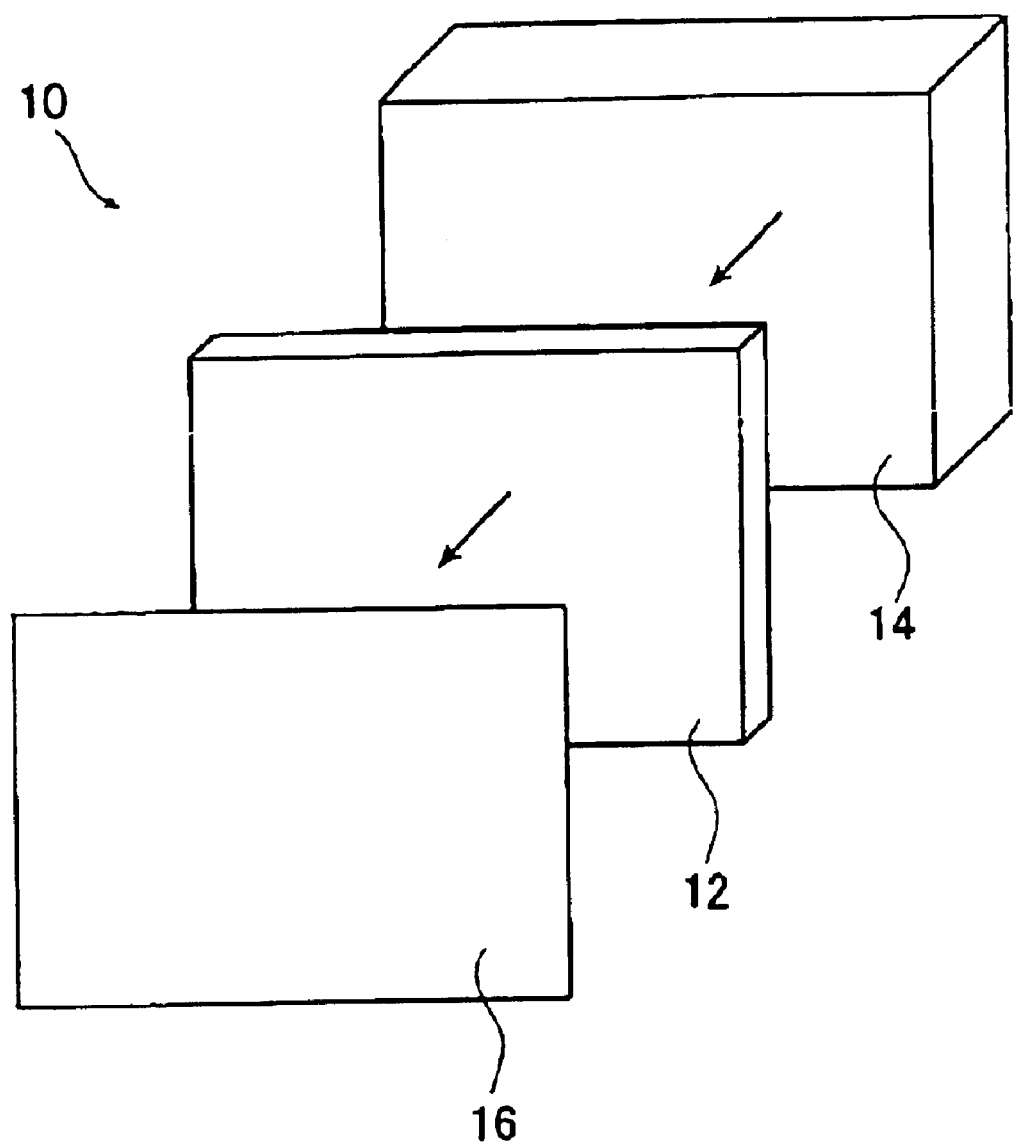
FIG. 1 is an exploded perspective view conceptually showing an embodiment of the display apparatus of the present invention.

FIG. 1 conceptually shows an embodiment of a display apparatus of a second aspect of the present invention which utilizes a light diffusing plate of a first aspect of the present invention.

As shown in FIG. 1, the display apparatus 10 for using a liquid crystal panel 12 as a display device of an image, namely, a liquid crystal display (hereinafter referred to simply as "LCD"), comprises the crystal panel 12, a backlight unit 14 which forces collimated light (straight traveling light) to be incident on the liquid crystal panel 12 and a light diffusing plate 16 of the first aspect of the present invention for diffusing light bearing an image which passed through the liquid crystal panel 12. Connected to the liquid crystal panel 12, is a driver (not shown) which drives it. Optionally provided to the display apparatus 10 are various members which a known LCD has.

The display apparatus 10 of the present invention utilizing the light diffusing plate 16 of the first aspect of the present invention can realize a high contrast ratio over a wide viewing angle so that it is advantageously applicable for a monitor or the like of a medical diagnosis apparatus.

The liquid crystal panel 12 to be utilized in the display apparatus 10 of the present invention is not limited to any particular type and all known liquid-crystal panels that are used in various kinds of LCDs may be employed as long as they have a liquid crystal sandwiched between two spaced transparent supports, which are overlaid with transparent electrodes to produce a liquid crystal-nipping support in a sheet form having an analyzer on one side and a polarizer on the other side.

Hence, the liquid-crystal panel 12 used in the display apparatus 10 of the present invention may be a full-color or monochromatic type and can be operated in all known modes including a TN (twisted nematic) mode, a STN (supertwisted nematic) mode, an ECNB (electrically controlled birefringence) mode, an IPS (in plane switching) mode, an MVA (multidomain vertical alignment) mode and the like. Particularly, the TN mode is preferable. In the liquid crystal display of the TN mode, a viewing angle characteristic is poor; however, a liquid crystal panel structure is simpler than that of the IPS, MVA mode or the like which has a wide viewing angle; therefore, the backlight utilization efficiency is high when used at high resolution so that a highly precise image display can be performed. The liquid-crystal panel 12 also has no limitations on a switching device or the matrix.

The backlight unit 14 is not limited to any particular type and all known light sources may be employed as long as they can emit a sufficient light quantity (intensity) of collimated light for observing the image. For example, one which utilizes a louver that allows a portion of scattering light to pass therethrough, another one which changes light emitted from a point light source to parallel light such as in an overhead projector, the other one which changes the scattering light to parallel light having directivity making use of microlens effect and the like are illustrated as preferable examples.

The light diffusing plate 16 has optical refractive power, has a structure which is composed of minute spheres or the like and is unrecognizable to a viewer of the display apparatus 10, has a relatively low light transmission for the area (non-passing area) other than the areas (passing areas) through which parallel light incident from the structure side primarily passes and, preferably, has light absorptivity in its non-passing area (namely, functions a blackmask) In this case, it is necessary that the diffusing plate 16 is coated with a material of the passing areas and another material of the non-passing area simultaneously. It is also preferable that its reflectivity against the extraneous light is 10% or less by the effect of the non-passing area.

FIG. 2A conceptually shows a sectional schematic view of an embodiment of the light diffusing plate of the first aspect of the present invention.

The light diffusing plate 16a shown in FIG. 2A which is an embodiment of the light diffusing plate 16 of the present invention has a structure that light-transmitting spheres (hereinafter referred to simply as "beads") 20 which compose a diffusing layer are fixed to a support sheet 18 having light transmissivity by a binder 22 having light absorptivity. It is preferable that a portion of each bead 20 in a major part of the beads 20 contacts the support sheet 18.

Therefore, as shown in chain lines in FIG. 2A, collimated light bearing the image which has been emitted from the backlight unit 14, passed through the liquid crystal panel 12, refracted (diffused) by the spherical beads 20, passed through the contact portions between beads 20 and a support sheet 18 and the nearby portions, which become light passing areas, to be sufficiently diffused. Since the binder 22 has light absorptivity, the non-passing area (a portion or potions other than the contact portions and the nearby portions) where beads 20 and the support sheet 18 do not contact with each other becomes blackmask so that the extraneous light from the viewer's side will not be reflected or diffused by the light diffusing plate 16; hence, there is no contrast decrease caused by the extraneous light.

According to the present invention, therefore, the display apparatus 10 (LCD) which can obtain a satisfactory contrast over a wide viewing angle can be achieved.

The support sheet 18 is not limited to any particular type and various materials can be used as long as they have sufficient light transmissivity (transmitting properties) as well as sufficient mechanical strength for the specific applications.

Specifically, various types of glass, various types of resin materials such as polyesters, polyolefins, polyamides, polyethers, polystyrenes, polyester amides, polycarbonates, polyphenylene sulfides, polyetheresters, polyvinyl chlorides, polymethacrylic esters and the like are preferably illustrated.

The light diffusing plate 16 of the present invention, starting with the light diffusing plate 16a as illustrated, may be of rigid plates, flexible sheets or film forms so that material, thickness or the like of the support sheet 18 may be selected in accordance with required mechanical strength or applications.

In order to enhance the viewability of the display apparatus 10, a layer 23 subjected to processing of antireflection of light is preferably provided on the viewing surface (the surface reverse to the beads 20) of the support sheet 18 by applying a known light non-reflection processing such as AR (anti-reflection) coating or the like thereon.

Beads 20 for forming a diffusing layer are light transmitting, are (nearly) spheres of a size which can not be recognized by the viewer and are fixed to the support sheet 18 by the binder 22 under the condition that many beads 20 and the support sheet 18 are in partial contact therebetween.

In the light diffusing plate 16a of the present invention, the beads 20 primarily compose a structure having the above-described optical refractive power so that the light diffusing plate 16a or the like employing beads 20 is arranged so as to have a side provided with beads 20 facing to the liquid crystal panel 12 and held under this condition.

Materials of the beads 20 are not limited to any particular type and various types are applicable as long as they are transparent. For example, the above-described various materials applicable for the support sheet 18 are preferably illustrated; particularly, from the point of satisfactory optical characteristics or the like, acryl or methacryl (hereinafter referred to simply as "(meth)acryl" in cases)—based resin or glass is preferably utilized.

The beads 20 are also not limited to any particular size but any size is permissible in accordance with applications or the like of the display apparatus 10 as long as the size is unrecognizable by the viewer. The size is preferably 3 $\mu$m to 40 $\mu$m, more preferably 5 $\mu$m to 20 $\mu$m.

Moreover, when the beads 20 are used for those of light diffusing plate of the image display apparatus of the third aspect of the present invention which will be described below, their preferable size may be 10 $\mu$m to 21 $\mu$m.

A binding material composing the binder 22 is not limited to any particular type but various types of adhesives are applicable as long as they can fix the beads 20 to the support sheet 18. For example, vinylacetate resins, ethylene-vinylacetate copolymers, vinylchloride resins, vinylchloride-vinylidenechloride copolymers, (meth)acrylate ester resins, butyral resins, silicone resins, polyester resins, vinylidenefluoride resins, nitrocellulose resins, polystyrene resins, styrene-acrylic copolymers, urethane resins, polyethylene resins, polypropylene resins, polyethylene chloride resin, rosin derivatives and a mixture thereof are preferably illustrated.

The binder 22 used in the present embodiment has light absorptivity. As the binders 22, a binding material having light absorptivity alone may be used but the binding material may be dispersed with a light absorber such as carbon black or the like to impart the binder 22 with light absorptivity.

A production method of such light diffusing plate 16a is not limited to any particular way but, for example, in one case, the binder 22 may be dispersed with the beads 20 to prepare a paint, then the thus prepared paint may be applied on the support sheet 18 and dried (cured) or, in another case, the binder may be applied on the support sheet 18, then beads 20 maybe sprinkled on the entire surface of the resultant support sheet 18 and, thereafter, the binder 22 may be dried.

In the present embodiment, since the binder 22 has light absorptivity, it is necessary that the quantity of the binder 22 is adjusted such that the beads 20 are fixed on the entire surface of the support sheet 18 uniformly in a manner that they are not completely buried in the binder 22, preferably more than half portion of each bead 20 is exposed from the binder 22. Optionally after the beads 20 may be pressed down or allowed to settle under gravity so that they come into contact with the support sheet 18, thereafter, the binder 22 may be dried.

FIG. 2B is a conceptual sectional schematic view of another embodiment of a light diffusing plate of the present invention.

The light diffusing plate 16b shown in FIG. 2B forms a light-sensitive material layer (light-sensitive thermal developing material layer) 24 by using a light-sensitive material which forms no color in the exposed area upon subsequent development, namely, positive, for example, a positive light-sensitive thermal developing material instead of the light absorptive binder 22, then the thus formed light-sensitive material layer is exposed and developed to form a blackmask.

In the light diffusing plate 16b shown in FIG. 2B and a light diffusing plate 16c which will be shown in FIG. 2C described below, many components are same to those of the light diffusing plate 16 shown in FIG. 2A so that same components are identified by same numerals and the following explanation is chiefly directed to the differing components (sites).

The light diffusing plate 16b shown in FIG. 2B has the light-sensitive material layer which is colored black, for example. The light-sensitive thermal developing material layer (hereinafter referred to simply as "color forming material layer") 24, on which the beads 20 are fixed, forms no color in the areas (passing areas) through which the light refracted by the beads 20 passes.

Therefore, even by the light diffusing plate 16b, in the same manner as in the embodiment shown in FIG. 2A, the collimated light bearing the image which passed through the liquid crystal panel 12 is refracted by the beads 20, passes through no color portions (light passing areas) of the color forming material layer 24 and is preferably diffused while the color forming material layer 24 becomes the blackmask (light non-passing area) so that the display apparatus (LCD) 10 which will not bring about decrease of contrast by reflection or scattering of extraneous light and which can obtain a satisfactory contrast ratio over a wide viewing angle can be realized.

The light-sensitive material which is a positive color forming material and which forms the color forming material layer (light-sensitive thermal developing material layer which is light-sensitive material layer), for example, is a material which forms no color in the exposed area even if developed, and upon exposure. The color forming material is then developed by heat or chemical reaction effected by heating to form a color in the non-exposed area that becomes a light shielding area (light non-passing area) and no color in the exposed area that becomes a light transmitting area (light passing area).

As a preferable example, a color forming material including thermal responsive microcapsules containing electron donor colorless dye, a compound containing an electron acceptor and polymeric vinylmonomer in the same molecule and a photo polymerization initiator, and the like are illustrated. With regard to this color forming material, these compounds and the photo polymerization initiator are present outside the thermal responsive microcapsules.

This color forming material is a recording material in which a composition (curable composition) of the color forming material present outside the thermal responsive microcapsule is cured (polymerized) and fixed by exposing and a movable (not fixed) compound or an electron acceptor compound having the above-described electron acceptor and polymeric vinylmonomer moves inside the color forming material by heating to allow the electron donor colorless dye to form a color; hence, a positive image is produced.

This color forming material is described in detail in Unexamined Published Japanese Patent Application (kokai) (hereinafter referred to simply as "JPA") No. 10-226174.

Moreover, the color forming material (light-sensitive thermal developing recording material) disclosed in JPA No. 3-87827 or No. 4-211252 is preferably applicable as the positive light-sensitive material.

Such light diffusing plate 16b is produced as described below.

Firstly, the color forming material layer 24 is applied to the support sheet 18, if desired, dissolved or dispersed in a solvent and thereafter dried.

Secondly, the beads 20 are fixed on the color forming material layer 24. For example, a paint which is the binder 25 dispersed with the beads 20 is applied thereon, or, after the binder 25 is applied. Then the beads 20 are sprinkled on its entire surface; the binder 25 is dried; and the beads 20 are fixed. In this case, before the beads 20 are fixed, the beads 20 on the binder 25 may be forced to contact the color forming material layer 24 by pressing down or precipitating them in the same manner as in the previous example.

Once the beads 20 have been fixed, the collimated light from the side of beads 20, preferably the similar collimated light as that emitted from the backlight unit 14, is incident on them. In doing such, the light incident on the beads 20 is refracted and (together with the light not incident on the beads 20) incident on the color forming material layer 24 to expose the incident areas. Namely, only the incident areas which the light passes through in the color forming material layer 24 are exposed and become light passing areas in which no color is formed even after development. It should be noted that the area other than the light passing areas constituting the light non-passing (shielding) area is not exposed, because the light launched into the beads 20 converges on the light passing areas by the beads 20, so that the color forming material layer 24 in the light passing areas can be exposed, but the light launched into the light non-passing area is not converged by the beads 20 so that the color forming material layer 24 in the light non-passing area can not be exposed sufficiently.

Next, by developing the color forming material layer 24 by the heat or chemical reaction effected by heating, only the unexposed area colors to become a light non-passing area; and the exposed areas become the light passing areas. The area which colors by this thermal development is, as described above, only the area through which the light refracted by the beads 20, namely, the diffused light or the like does not pass. Therefore, the color forming material layer 24 preferably acts as the blackmask which absorbs extraneous light from the side of viewers.

In the present embodiment (as well as an embodiment shown in FIG. 2C to be described later), when the binder 25 is used for fixing the beads 20, the binder 25 is preferably light transmissive and, particularly, colorless and transparent; for example, various materials illustrated previously as binding materials of the binder 22 of the light diffusing plate 16a are applicable.

Moreover, when the binder 25 is used for fixing the beads 20 though not limited to such way, the beads 20 and the binder 25 become preferable as the difference of their refractive indices becomes smaller; more preferably it is 0.1 or less. By doing such way, light reflection at an interface between them can be prevented so that a more preferable image can be viewed.

In both embodiments, a ratio between quantities of the binder 25 and the beads 20 is not limited to any particular value but the ratio is preferably 1 to 5 by weight from the standpoint of surface condition, luminance of the light diffusing plate surface when the image is displayed or the like. In the present embodiment, since the binder 25 is light-transmitting, the beads 25 may be buried therein.

FIG. 2C is a sectional schematic view conceptually showing another embodiment of a light diffusing plate of the present invention.

The light diffusing plate 16c shown in FIG. 2C uses an ablative material which is light transmissive, preferably a black light-sensitive ablative material, instead of the color forming material layer 24, and uses the resultant ablative layer 26 as a blackmask; except for the above arrangement, it is basically composed of the same components as the light diffusing plate 16b shown in FIG. 2B described above and can be produced in the same manner.

Namely, after the ablation layer 26 comprising the light-sensitive ablative material is formed on the support sheet 18, the beads 20 is fixed in the same manner as the light diffusing plate 16b.

Then, the collimated light is incident from the side of beads 20. By doing such way, light or the like refracted by the beads 20 heats the light-sensitive ablative material; the material in an area which is heated by the light is removed by means of ablation; and the material only in an area on which the light not refracted and converged by the beads 20 is incident is not heated and remains thereby forming the ablation layer 26 preferably acting as the blackmask.

In the present invention, the applicable light-sensitive ablative material is not limited to any particular type but various materials can be applied as long as they can form a light absorptive layer, preferably black layer as well as generate satisfactory ablation by heating by means of light.

Specifically, a material described in Laid-Open Great Britain Patent Application No. 2,083,726 which contains a dye and a light-absorptive substance in the color forming material layer and evaporates the dye by heating, a material described in U.S. Pat. No. 5,429,909 which has a color forming layer comprising an image-forming dye, an infrared absorption substance and a binder, materials described in JPA Nos. 9-104173 and 9-104174 which comprise resin materials such as nitrocellulose, cellulose acetate propionate, cellulose acetate or the like, infrared absorption substances such as carbon black or the like and optional ablation enhancers such as foaming agents (azides or the like), accelerators (e.g., 4,4'-diazidobenzophenone and 2,6-di(4-azidobenzal)-4-methylcyclohexanone or the like) or the like are illustrated.

As shown in FIGS. 3A and 4A, when the color forming material layer 24 which becomes the blackmask is formed by the positive light-sensitive material having the relatively high sensitivity with self alignment process, an area (space) spaced among adjacent beads 20 is exposed and, after developed, is transmissive to light. This fails to change the color forming material layer 26 to the blackmask and impairs a function which diffusing plates 16d and 16e shown in FIG. 3B and FIG. 4B respectively are desired as a blackmask. Therefore, it is necessary for a counter measure which makes this area non-transmissive to light to be taken.

For this reason, when the diffusion plate 16d shown in FIG. 3A or the diffusion plate 16e shown in FIG. 4A is produced, the color forming material layer (light-sensitive material layer) 24 itself or its upper layer (a layer closer to an exposure light source), for example, the binder 30, is formed so as to become a layer which absorbs exposure light at a medium degree, namely, has medium density on the exposure light. In order to form the color forming material layer 24 itself or the binder 30 of its upper layer as a layer having such medium density, the material itself forming the color forming material layer 24 or the binder 30 itself of the upper layer of the color forming material layer 24 which has medium density may be used but an absorption agent may be added to the color forming material layer 24 or the binder 30 of its upper layer so that each of them absorbs the exposure light at a medium degree.

By doing such, an area (space) spaced among adjacent beads 20 (for example, the color forming material layer 24 shown in FIG. 3A or the binder 30 shown in FIG. 4A) has medium density and is thick so that the exposure light is attenuated and does not sufficiently expose the light-sensitive material of the color forming material layer 24 which is, then, after developed, to form a color, thereby shielding a visible light. On the other hand, since the coloring layer 24 shown in FIG. 3A which is the light absorptive layer or the binder 30 shown in FIG. 4A is thin, light passed through the beads 20 exposes the light-sensitive material of the color forming material layer 24 in its optical path which, even after developed, does not form the color, as well as, since the light absorptive layer is thin, light transmissivity which is the desired function is not impaired.

Therefore, when the diffusion plate 16d as shown in FIG. 3B is produced, as a binder to bond the beads 20 to the transparent support sheet 18, a light-sensitive material which has a medium density on its light-sensitive wavelength and, after developed by heat or chemical reaction, forms color at high density in the visible light range.

For example, the color forming material layer 24 comprising the material having such characteristic is applied on the transparent support sheet 18; the beads 20 are sprinkled on the entire surface of the thus applied sheet; the beads 20 come in contact to the support sheet 18, if necessary, by pressing or precipitating them; the color forming material layer 24 is dried; and the beads are bonded to the support sheet 18 by the color forming material layer 24 to be fixed there.

Thereafter, as shown in FIG. 3A, when the collimated light as the exposure light is incident from the side of the beads 20, the light incident on the beads 20 is refracted and is incident on areas between bottom portions of the beads 20 and the support sheet 18, contact areas therebetween or areas of thin portions of the color forming material layer 20 which are nearby (adjacent) to the contact areas therebetween. Though the color forming material layer 24 in these areas has a medium density, it is thin so that it is sufficiently illuminated by the exposure light whereupon the areas are sufficiently exposed. At this time, the exposure light is also incident on the color forming material layer 24 in the area spaced among adjacent beads 20 but, since the color forming material layer 24 in this area is thick, it is not sufficiently exposed so that it remains as an unexposed area.

Then, by developing the color forming material layer 24 by the heat or the chemical reaction effected by heating, only the unexposed area forms a color in a high density to be a light non-passing area whereas the exposed areas forms no color to be light passing areas. In doing such, as shown in FIG. 3B, the diffusing plate 16d having the color forming material layer 24, forms a high density color and functions as a blackmask.

As shown in FIG. 3C, by using the thus produced diffusing plate 16d, the light bearing the image that passes through the liquid crystal panel 12 is refracted in the beads 20 and is sufficiently diffused while the color forming material layer 24, functioning as the blackmask, absorbs the extraneous light from the side of the support sheet 18 (viewer) in a substantial manner.

Moreover, as shown in FIG. 4B, when the diffusion plate 16e is produced, firstly, the color forming material layer 24 comprising a light-sensitive material, which forms a high density color in the visible light range after being developed by a heat or chemical reaction, is formed on the transparent support sheet 18. Then beads 20 are bonded on the thus formed layer using a resin having a medium density, in its light-sensitive wavelength, as a binder 30 to be fixed thereon.

Thereafter, as shown in FIG. 4A, when the collimated light, as exposure light, is incident from the side of the beads 20, the light which is incident into the beads 20 is refracted and is then incident on areas between bottom portions of the beads 20 and the color forming material layer 24, contact areas therebetween or areas of thin portions of the binder 30 adjacent to the contact areas. Though the color forming material layer 24 in these areas has a medium density, it is thin so that the exposure light passes therethrough to sufficiently expose the color forming material layer 24 in the areas. At this time, the exposure light is also incident on the binder 30 in the area spaced among adjacent beads 20; however, since the binder 30 in this area is thick, the color forming material layer 24 thereunder is not sufficiently exposed so that it remains as an unexposed area.

Then, by developing the color forming material layer 24 by the heat or the chemical reaction effected by heating, only the unexposed area forms a color in a high density that is a light non-passing area, whereas the exposed areas form no color such that it is a light passing area. In doing such, as shown in FIG. 4B, the color forming material layer 24 that forms color in a high density functions as a blackmask.

As shown in FIG. 4C, by using the thus produced diffusion plate 16e, the light bearing the image which passes through the liquid crystal panel 12 is refracted in the beads 20 and is sufficiently diffused while the color forming material layer 24, functioning as the blackmask, absorbs an extraneous light from the side of the support sheet 18 (viewer) in a substantial manner.

In this case, as shown in FIGS. 5A to 5C, before the beads 20 are fixed, the beads 20 on a layer 32 which contacts the beads 20 may be pressed down or precipitated to force them to contact the support sheet 18.

Namely, as shown in FIG. 5A, the layer 32 to contact the beads 20 is formed on the support sheet 18, for example, by applying the binder 22 as shown in FIG. 2A or the color forming material layer 24 as shown in FIG. 3A; then, as shown in 5B, the beads 20 are sprinkled on the entire surface of the thus formed contact layer 32. This is succeeded by pressing down or precipitating the beads 20 on the contact layer 32, as shown in 5C, the beads 20 are forced to contact the support sheet 18.

Though not illustrated, before the beads 20 are fixed to the color forming material layer 24 (see FIG. 2B), ablation layer 26 (see FIG. 2C), the color forming material layer 24 (see FIG. 4A) or the like, the beads may of course be pressed down or precipitated to force them to contact the color forming material layer 24 or ablative layer 26 as an under layer.

The light diffusing plate of the first aspect of the present invention and the display apparatus of the second aspect of the present invention are basically composed as described above.

Next, an image display apparatus of a third aspect of the present invention will now be described in detail with reference to FIGS. 6 to 8.

Figure 6:
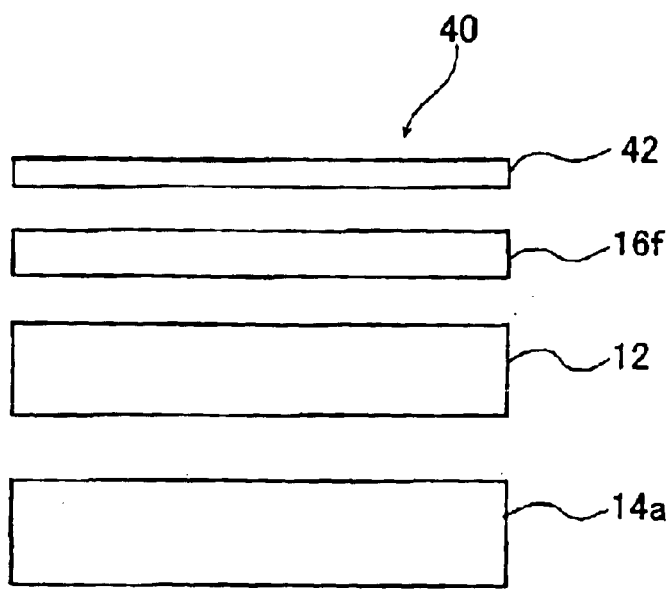
FIG. 6 is a conceptual view showing an embodiment of an image apparatus device of the present invention.

FIG. 6 conceptually shows an embodiment of an image display apparatus adaptable to the present invention.

The image display apparatus 40 shown in FIG. 6 has same components except for some components as the display apparatus 10 shown in FIG. 1 so that same components are identified by same numerals and the following explanation is chiefly directed to the differing components.

The image display apparatus 40 shown in FIG. 6 is a so-called liquid crystal display (LCD) which utilizes the liquid crystal panel 12 as a display device of an image. The image display apparatus 40 comprises the liquid crystal panel 12, the backlight unit 14a which allows light to be incident on the liquid crystal panel 12, the light diffusing plate 16f which is applied on the surface of the liquid crystal panel 12 and diffuses the light that passes through the liquid crystal panel 12 and an extraneous light scattering preventing sheet 42 applied thereon. To the liquid crystal panel 12, a color filter (not shown) having a matrix structure is provided; and a drive (not shown) which drives the liquid crystal panel 12 is connected. Optionally provided to the image display apparatus 40 are various members which a known LCD has.

In the present embodiment, the LCD is utilized as the image display apparatus 40; however, the image display apparatus 40 is not limited to the LCD but it may be CRT or PDP, as long as it has a matrix structure.

The backlight unit 14a can utilize all the light sources including the above-described backlight unit 14 that emits the collimated light as long as they can emit a sufficient quantity of light for viewing the image. The light to be emitted from the backlight unit 14a may not be necessarily collimated. When pixelization is controlled, it is better for the image to be blurred; hence it is preferable that the light is not collimated.

The light diffusing plate 16f has optical refractive power and has a structure which is composed of a minute spheres or the like and is unrecognizable to the viewer of the display apparatus 40.

Figure 7:
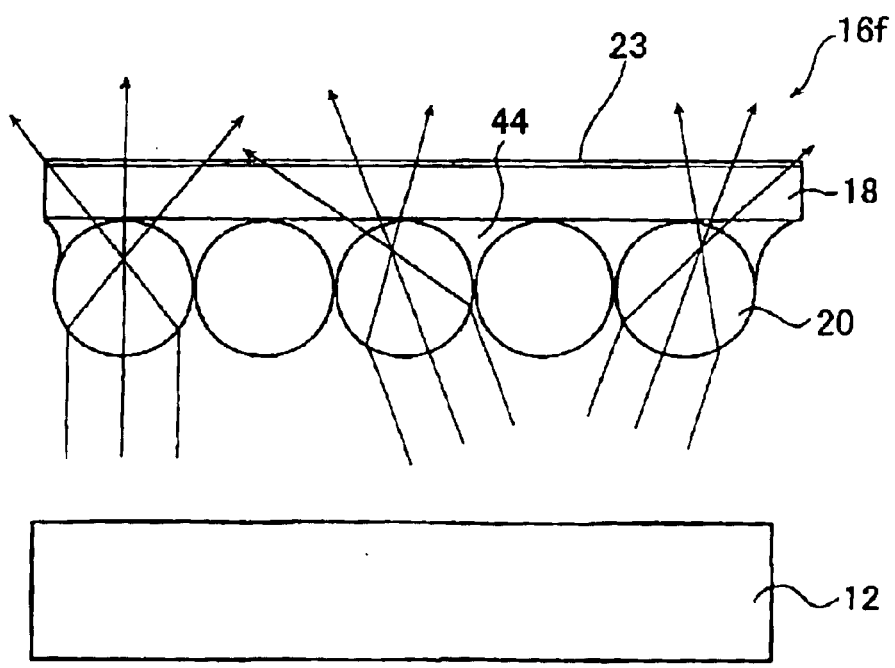
FIG. 7 is a schematic view showing a liquid crystal display panel and a light diffusing plate of the image display apparatus shown in FIG. 6.

FIG. 7 is a conceptual view showing an example of a light diffusing plate 16f.

The light diffusing plate 16f shown in FIG. 7 has a structure in which light transmitting spheres (referred to simply as "beads" in this case) 20 are fixed to the light transmitting support sheet 18 by means of a binder 44. Bottom portions of the beads 20 contacts the support sheet 18.

In the present embodiment, the backlight is not necessarily collimated light as described above; preferably, by using the light transmitting binder 44, as shown by arrows in FIG. 7, the light bearing the image which passes through the liquid crystal panel 12 is incident into the beads 20 from various directions and is refracted by the beads 20 so that it is sufficiently scattered.

The binder 44 is not limited to any particular material but various adhesives are applicable as long as they can fix the beads 20 on the support sheet 18. In the present embodiment, it is preferable that the binder 44 is light transmissive. For example, the binding materials used to the above-described binder 22 or 25 can be employed.

Figure 8:
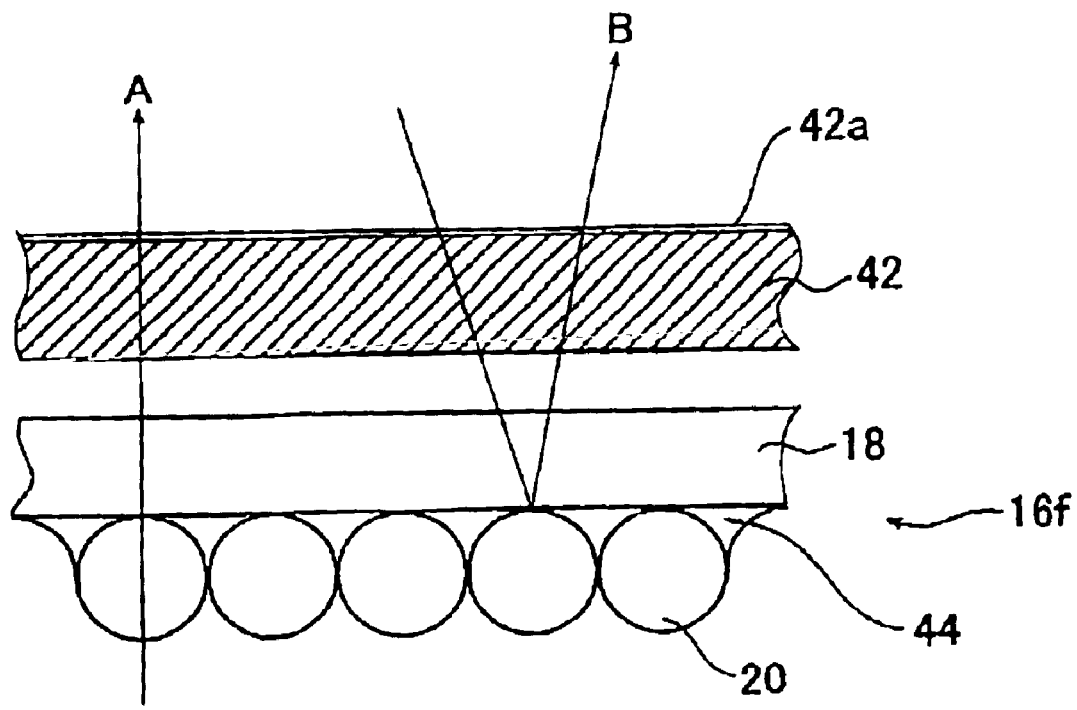
FIG. 8 is a schematic view showing a light diffusing plate and an extraneous light scattering preventing sheet of the image display apparatus shown in FIG. 6.

FIG. 8 is an enlarged view showing a light diffusing plate 12 and an extraneous light scattering preventing sheet 42.

The extraneous light scattering preventing sheet (hereinafter referred to simply as "preventing sheet") 42 which absorbs light and prevents the extraneous light from being scattered by decreasing light transmissivity is not limited to any particular way but is preferably treated with AR processing on its surface 42a. As the preventing sheet 42, for example, a visual display terminal (VDT) filter mounted on a monitor of a personal computer or the like is preferably used.

Take, for example, that the light transmissivity of the preventing sheet 42 is 30%, as shown by an arrow A in FIG.

8. If light passes through the preventing sheet 42 once, only 30% of an incident light (100%) passes therethrough. On the other hand, as shown by an arrow B in FIG. 8, if light is incident on the preventing sheet 42 from outside, is reflected at the beads 20 of the light diffusing plate 16f and goes out by passing through the preventing sheet 42 again, since the light passes the preventing sheet 42 twice, its transmissivity is 30% of 30%, namely, 9% (0.3×0.3=0.09). Therefore, the light transmissivity of the reflected light of the extraneous light is decreased by a square of the transmissivity of the preventing sheet 42, which is extremely small and thereby effectively prevents the extraneous light from being scattered.

As is described above, in the present embodiment, the light diffusing plate 16f is applied to the surface of the LCD 12; the light which passes through the LCD 12 is diffused; a matrix structure of the LCD 12 is forced to be unrecognizable; hence, a smooth, natural image can be obtained.

In this case, by applying the preventing sheet 42 on the light diffusing plate 16f, the extraneous light that is scattered by the beads 20 of the light diffusing plate 16f, which will cause a decrease of contrast is prevented. As a result, depixelization can be attained without decreasing contrast, for example, when applied to a medical use, a smooth, natural image appropriate for diagnosis can be displayed on the image display apparatus.

As described above, the extraneous light scattering preventing sheet intentionally decreases its transmissivity to reduce the influence of the extraneous light up to a square of its transmissivity so that it functions like a face-plate of CRT. Without applying the extraneous light scattering preventing sheet on the light diffusing plate, the support sheet of the light diffusing plate may have the function of the extraneous light scattering preventing sheet. In this case, the support sheet may be prepared so as to have the light transmissivity of, for example, about 30%.

While the light diffusing plate, display apparatus and image display apparatus of the present invention have been described above in detail with reference to various embodiments, it should be noted that the invention is by no means limited to the foregoing embodiments and various improvements and design modifications may of course be made without departing from the scope and spirit of the invention.

For example, the light diffusing plate uses beads in the present embodiments; however, it is by no means limited to them.

As has been described above in detail, the light diffusing plate of the first aspect of the present invention is an light diffusing plate having an excellent light diffusing property as well as an excellent characteristic that reflection and scattering of the extraneous light is small.

The display apparatus of the second aspect of the present invention using such light diffusing plate of the first aspect of the present invention has an excellent light diffusing property and a preferable contrast ratio over a wide viewing angle by decreasing the reflection of the extraneous light and, as a result, is a liquid crystal display that is advantageously applicable for medical purposes.

As has been described above, according the third aspect of the present invention, without decreasing the contrast, jaggy of the displayed image can be eliminated, namely, depixelization can be performed whereupon a smooth, natural image can be displayed on the image display apparatus.

Therefore, particularly, when the present invention is applied to medical uses, a smooth, natural image appropriate for diagnosis can be obtained thereby being especially capable of performing its effect.

What is claimed is:

1. A light diffusing plate comprising:
   an unresolvable structure which has an optical refractive power and includes light transmitting spheres;
   individual passing areas through which a collimated light incident from a side of the unresolvable structure passes;
   a low-passing area other than said passing areas, which has relatively low light transmissivity compared with the passing areas, said passing areas and low-passing area being provided in a same plane; and
   a binder adhered to at least a circumferential portion of said spheres, said circumferential portion is part of a half of said spheres which faces said plane,
   wherein said individual passing areas respectively correspond to said light transmitting spheres and are separated by said low-passing area, such that portions of said passing areas and a portion of said low-passing area are disposed past said spheres in a passing direction of the collimated light, said low passing area being darker than said passing areas.

2. The light diffusing plate according to claim 1, wherein the light diffusing plate comprises a light transmitting support; and
   a diffusing layer formed on said light transmitting support;
   wherein said light transmitting spheres are fixed to the light transmitting support with said binder, which is light absorptive binder and constitutes a portion of said low-passing area.

3. A light diffusing plate, comprising:
   a light transmitting support;
   a diffusing layer having light transmitting spheres; and
   a light-sensitive thermal developable material layer which is formed between said light transmitting support and the diffusing layer;
   wherein said light-sensitive thermal developable material layer contains a light-sensitive thermal developable material which has colorless areas; and
   wherein said light-sensitive thermal developable material has colored areas formed by being heated after nearly collimated light is incident from said diffusing layer side.

4. A light diffusing plate comprising:
   a light transmitting support;
   a diffusing layer having light transmitting spheres; and
   a thermal ablative layer between said light transmitting support and the diffusing layer;
   wherein said thermal ablative layer contains a light absorptive thermal ablative material;
   wherein said layer of thermal ablative material has intermittent areas where said thermal ablative material has been removed; and
   wherein said intermittent areas where said thermal ablative material has been removed correspond to said light transmitting spheres and are separated by non-removed areas of said thermal ablative material, such that a portion of said removed area and portions of said non-removed areas are disposed past said spheres in a direction of the collimated light.

5. A light diffusing plate comprising:

a light transmitting support;

a diffusing layer containing light transmitting spheres; and a contacting material which contacts said light transmitting spheres;

wherein said contacting material contains a light-sensitive material which has a colorless exposed area and a light absorptive material; and wherein said light-sensitive material also has colored areas that are formed from being heated and developed after nearly collimated light is incident from a side of said diffusing layer.

6. A light diffusing plate comprising:

a light transmitting support;

a diffusing layer containing light transmitting spheres;

a contacting material which contacts said light transmitting spheres and contains a light absorptive material; and a light-sensitive material which has a colorless exposed area and is provided between said contacting material and said light transmitting support;

wherein said light-sensitive material also has colored areas that are formed from being heated and developed after nearly collimated light is incident from a side of said diffusing layer.

7. The light diffusing plate according to claim 3, wherein said diffusing layer is formed by forming a layer of a contacting material previously and then embedding said light transmitting spheres into the layer of the contacting material.

8. The light diffusing plate according to claim 4, wherein said diffusing layer is formed by forming a layer of a contacting material previously and then embedding said light transmitting spheres into the layer of the contacting material.

9. The light diffusing plate according to claim 5, wherein said diffusing layer is formed by forming a layer of said contacting material previously and then embedding said light transmitting spheres into the layer of the contacting material.

10. The light diffusing plate according to claim 6, wherein said diffusing layer is formed by forming a layer of said contacting material previously and then embedding said light transmitting spheres into the layer of the contacting material.

11. The light diffusing plate according to claim 2, wherein a surface of an opposite side to said diffusing layer in said light transmitting support is treated with light non-reflection processing.

12. The light diffusing plate according to claim 3, wherein a surface of an opposite side to said diffusing layer in said light transmitting support is treated with light non-reflection processing.

13. The light diffusing plate according to claim 4, wherein a surface of an opposite side to said diffusing layer in said light transmitting support is treated with light non-reflection processing.

14. The light diffusing plate according to claim 5, wherein a surface of an opposite side to said diffusing layer in said light transmitting support is treated with light non-reflection processing.

15. The light diffusing plate according to claim 6, wherein a surface of an opposite side to said diffusing layer in said light transmitting support is treated with light non-reflection processing.

16. A display apparatus comprising:

a liquid crystal display panel;

a backlight unit which forces a collimated light to be incident on said liquid crystal display panel; and a light diffusing plate which is located in an opposite side of said backlight unit against said liquid crystal display panel, said light diffusing plate comprises an unresolvable structure which has an optical refractive power and includes light transmitting spheres, passing areas through which a collimated light incident from a side of the unresolvable structure passes, and a low-passing area other than said passing areas, which has relatively low light transmissivity compared with the passing areas, said passing areas and low-passing area being provided in a same plane; and a binder adhered to at least a circumferential portion of said spheres, said circumferential portion is part of a half of said spheres which faces said plane, wherein said passing areas correspond to said structure having optical refractive power and are separated from each other by said low-passing area, such that portions of said passing areas and a portion of said low-passing area are disposed past said structure having, optical refractive power in a passing direction of the collimated light, said low passing area being darker than said passing areas.

17. A display apparatus comprising:

a liquid crystal display panel;

a backlight unit which forces a collimated light to be incident on said liquid crystal display panel; and a light diffusing plate which is located in an opposite side of said backlight unit against said liquid crystal display panel;

wherein said light diffusing plate comprises a light transmitting support, a diffusing layer having light transmitting spheres, and a light-sensitive thermal developable material layer which is formed between said light transmitting support and the diffusing layer;

wherein said light-sensitive thermal developable material layer contains a light-sensitive thermal developable material which has a colorless exposed area; and wherein said light-sensitive thermal developable material has colored areas formed by being heated after nearly collimated light is incident from said diffusing layer side.

18. A display apparatus comprising:

a liquid crystal display panel;

a backlight unit which forces a collimated light to be incident on said liquid crystal display panel; and a light diffusing plate which is located in an opposite side of said backlight unit against said liquid crystal display panel;

wherein said light diffusing plate comprises a light transmitting support, a diffusing layer having light transmitting spheres, and a thermal ablative layer formed between said light transmitting support and the diffusing layer;

wherein said thermal ablative layer contains a light absorptive thermal ablative material;

wherein said thermal ablative layer has intermittent areas where said thermal ablative material has been removed; and wherein said intermittent areas where said thermal ablative material has been removed correspond to said light transmitting spheres and are separated by non-removed areas of said thermal ablative material, such that a portion of said removed area and portions of said non-removed areas are disposed past said spheres in a direction of the collimated light.

19. A display apparatus comprising:
a liquid crystal display panel;
a backlight unit which forces a collimated light to be incident on said liquid crystal display panel; and
a light diffusing plate which is located in an opposite side of said backlight unit against said liquid crystal display panel;
wherein said light diffusing plate comprises a light transmitting support, a diffusing layer containing light transmitting spheres, and a contacting material which contacts said light transmitting spheres;
wherein said contacting material contains a light-sensitive material which has a colorless exposed area and a light absorptive material; and
wherein said light-sensitive material also has colored areas that are formed from being heated and developed after nearly collimated light is incident from a side of said diffusing layer.

20. A display apparatus comprising:
a liquid crystal display panel;
a backlight unit which forces a collimated light to be incident on said liquid crystal display panel; and
a light diffusing plate which is located in an opposite side of said backlight unit against said liquid crystal display panel;
wherein said light diffusing plate comprises a light transmitting support, a diffusing layer containing light transmitting spheres, a contacting material which contacts said light transmitting spheres and contains a light absorptive material, and a light-sensitive material which has a colorless exposed area and is provided between said contacting material and said light transmitting support; and
wherein said light-sensitive material also has colored areas that are formed from being heated and developed after nearly collimated light is incident from a side of said diffusing layer.

21. An image display apparatus comprising:
an image display device having a matrix structure; and
a light diffusing plate comprising:
    an unresolvable structure which has an optical refractive power and includes light transmitting spheres;
    individual passing areas through which a collimated light incident from a side of the unresolvable structure passes; and
    a low-passing area other than said passing areas, which has relatively low light transmissivity compared with the passing areas, said passing areas and low-passing area being provided in a same plane; and
    a binder adhered to at least a circumferential portion of said spheres, said circumferential portion is part of a half of said spheres which faces said plane,
wherein said light diffusing plate is provided on a viewing side of a display screen of said image display device, and
wherein said passing areas correspond to said structure having optical refractive power and are separated from each other by said low-passing area, such that portions of said passing areas and a portion of said low-passing area are disposed past said structure having optical refractive power in a passing direction of the collimated light, said low passing area being darker than said passing areas.

22. The image display apparatus according to claim 21, wherein said light diffusing plate comprises a light transmuting support and a diffusing layer formed by coupling light transmitting spheres with said binder to the light transmitting support.

23. The image display apparatus according to claim 21, further comprising a preventing sheet which prevents extraneous light from being scattered;
wherein said preventing sheet is provided on the light diffusing plate which is provided on said viewing side of said display screen.

24. An image display apparatus comprising:
an image display device having a matrix structure; and
a light diffusing plate comprising:
    a light transmitting support;
    an unresolvable structure having light transmitting spheres through which collimated light passes, and which has an optical refractive power;
    a binder which fixes said light transmitting spheres in place, and said binder is adhered to at least a circumferential portion of said spheres, said circumferential portion is part of a half of said spheres where the collimated light exits; and
    a layer of material having intermittent areas where light transmissivity is greater than other areas in said layer, said layer disposed past said spheres in a passing direction of the collimated light,
wherein said light diffusing plate is provided on a viewing side of a display screen of said image display device.

25. The image display apparatus according to claim 24, further comprising a preventing sheet for preventing from scattering an extraneous light;
wherein said preventing sheet is provided on the light diffusing plate which was provided on said viewing side of said display screen.

26. The display apparatus according to claim 16, further comprising a preventing sheet which prevents extraneous light from being scattered;
wherein said preventing sheet is provided on the light diffusing plate which is provided on a viewing side of a display screen of said liquid crystal display panel.

27. The display apparatus according to claim 17, further comprising a preventing sheet which prevents extraneous light from being scattered;
wherein said preventing sheet is provided on the light diffusing plate which is provided on a viewing side of a display screen of said liquid crystal display panel.

28. The display apparatus according to claim 18, further comprising a preventing sheet which prevents extraneous light from being scattered;
wherein said preventing sheet is provided on the light diffusing plate which is provided on a viewing side of a display screen of said liquid crystal display panel.

29. The display apparatus according to claim 19, further comprising a preventing sheet which prevents extraneous light from being scattered;
wherein said preventing sheet is provided on the light diffusing plate which is provided on a viewing side of a display screen of said liquid crystal display panel.

30. The display apparatus according to claim 20, further comprising a preventing sheet which prevents extraneous light from being scattered;

wherein said preventing sheet is provided on the light diffusing plate which is provided on a viewing side of a display screen of said liquid crystal display panel.

31. A production method of producing a light diffusing plate that comprises a light transmitting support, an unresolvable structure which has an optical refractive power and includes light transmitting spheres, individual passing areas through which a collimated light incident from a side of the unresolvable structure passes, a low-passing area other than said passing areas, which has relatively low light transmissivity compared with the passing areas, and a binder adhered to at least a circumferential portion of said spheres, comprising the steps of:

preparing a paint by mixing materials of said passing areas and low-passing area;

applying simultaneously said paint on the light transmitting support in such a way that said passing areas and low-passing area are provided in a same plane on the light transmitting support and said circumferential portion of said spheres is part of a half of said spheres which faces said plane; and drying or curing said applied paint.

32. The production method according to claim 31, wherein said materials of said passing areas and low-passing area are said spheres and said binder which is a light absorptive binder, respectively, said prepared paint is obtained by dispersing said binder with said spheres, and said dried or cured paint is formed on said light transmitting support as a diffusing layer in which said light transmitting spheres which constitute said passing areas, respectively, are fixed to the light transmitting support with said binder which constitutes a portion of said low-passing area.

33. A light diffusing plate, comprising:

a light transmitting support;

an unresolvable structure which has an optical refractive power and includes light transmitting spheres disposed on or contacted to said light transmission support;

individual passing areas through which a collimated light incident from a side of the unresolvable structure passes;

a low-passing area other than said passing areas, which has relatively low light transmissivity compared with the passing areas, said passing areas and low-passing area being provided in a same plane on said light transmitting support; and a binder adhered to at least a circumferential portion of said spheres, said circumferential portion being part of a half of said spheres which faces said plane;

wherein said individual passing areas respectively correspond to said light transmitting spheres and are separated by said low-passing area, such that portions of said passing area and a portion of said low-passing area are disposed past said spheres in a passing direction of the collimated light.

34. The light diffusing plate according to claim 33, wherein the light diffusing plate comprises a diffusing layer formed on said light transmitting support; wherein said light transmitting spheres are fixed to the light transmitting support with said binder, which is a light absorptive binder and constitutes a portion of said low-passing area.

* * * * *